United States Patent [19]

McEwen

[11] Patent Number: 5,135,364
[45] Date of Patent: Aug. 4, 1992

[54] PUMP MOUNTING APPARATUS FOR FILTRATION SYSTEM

[75] Inventor: Stephen N. McEwen, Bowling Green, Ohio

[73] Assignee: Henry Filters, Inc., Bowling Green, Ohio

[21] Appl. No.: 514,752

[22] Filed: Apr. 26, 1990

Related U.S. Application Data

[63] Continuation-in-part of Ser. No. 144,058, Jan. 15, 1988, abandoned.

[51] Int. Cl.$^5$ .................... F04B 139/14; F04B 35/04
[52] U.S. Cl. .................... 417/360; 417/424.1; 417/423.15
[58] Field of Search .......... 417/360, 424.1, 423.15, 417/423.3, 423.9

[56] References Cited

U.S. PATENT DOCUMENTS

| | | | |
|---|---|---|---|
| 2,839,006 | 6/1958 | Mayo | 417/424.1 |
| 2,930,325 | 3/1960 | Beard | 417/423.15 |
| 3,637,331 | 1/1972 | Smith et al. | 417/424 |
| 3,807,905 | 4/1974 | Pochyly | 417/360 |
| 3,880,553 | 4/1975 | Wolford | 417/360 |
| 4,900,438 | 2/1990 | McEwen | 417/360 |
| 4,975,184 | 12/1990 | McEwen | 417/423.15 |
| 5,030,346 | 7/1991 | McEwen | 417/360 |

*Primary Examiner*—Richard A. Bertsch
*Assistant Examiner*—Peter Korytnyk
*Attorney, Agent, or Firm*—Brooks & Kushman

[57] ABSTRACT

The pump includes a discharge head having a pair of axially spaced end walls. The tank includes a housing in communication with a liquid outlet conduit and forms part of a substantially permanently stationary pipe column which receives clean coolant from the receptor side of a filtration system. By freely suspending the pump by its discharge head in the tank housing of the pipe column, the removal of the pump is facilitated by minimizing the criticality of its mounting connections in the filtration system. The pump is thus mounted for movement between operative and out-of-the-way positions whereby the pump may be readily removed from and reinstalled in the tank without disconnection or connection of pipe fittings within the tank and without aligning the pump with the receptor.

8 Claims, 3 Drawing Sheets

PUMP MOUNTING APPARATUS FOR FILTRATION SYSTEM

CROSS-REFERENCE TO RELATED APPLICATION

This application is a continuation-in-part of U.S. Application, Ser. No. 144,058 Jan. 15, 1988 now abandoned in the name of Stephen N. McEwen.

TECHNICAL FIELD

This invention relates to pump mounting systems and, more particularly, to an apparatus for removably mounting a pump in an industrial filtering system without the use of tools.

BACKGROUND ART

In machine tool operations, settlement tanks containing filters are widely used to separate machine tool chips and other contaminants, referred to as swarf, from coolant so that clean coolant may be returned to the machine tools for reuse. Generally, such tanks are set below elevation such that sluiceways, likewise located below elevation, convey the contaminated liquid and machining chips to the settlement tank. The chips settle to the bottom of the tank and a dragout conveyor system is employed to convey the chips and swarf from the tank for removal, conventionally up a ramp located at one end of the tank. Filters are employed in the tank to separate the smaller chips and other contaminants from the coolant. While there are many different types of filters and arrangements thereof used for this purpose, one well known and commercially successful system manufactured and sold by the assignee hereof, Henry Filters, Inc. This system uses one or more horizontally disposed filter drums located adjacent the bottom of the tank. A suction is provided to the interior of the filter drum to pull coolant through the filter element. Filter cake, comprised of small chips and other contaminants, is thus formed on the outside of the drum surface. The drum is periodic indexed to enable a doctor blade to shave off a portion of the accumulated filter cake, which drops to the bottom of the tank for removal by the dragout conveyor.

In the example of a filtration system discussed above, a clean coolant is also provided in the tank for receiving the clean coolant filtrate. Although many types of centrifugal pumps are used, such as horizontal split case, end suction, and self-priming types, one embodiment of such a filtration system uses one or more vertical turbine-type pumps. These pumps are disposed in the clean coolant tank for applying suction to the interior of the filter drum(s), as well as for supplying clean coolant to a header for return to the machine tools. More particularly, these vertical turbine pumps each typically comprise an elongated casing connected at its lower end with one or more impeller stage(s) for pumping clean coolant filtrate upwardly through the elongated casing. The impeller stages of each pump are driven by an electric motor mounted at the top of the casing above the liquid level in the tank. The motor drives the impellers by a central drive shaft which extends the length of the casing through multiple bearing assemblies supported the casing. The lower end of the pump is received in a receptor ring located to enable the pump suction to connect through a suction chamber to the interior of the filter drum(s). The outlet for each vertical turbine pump is located above the coolant level of the filtration tank and above the tank itself and is connected to a header into which the clean coolant is discharged for return to the machine tools. Such arrangement is generally described and illustrated in Assignee's U.S. Pat. No. 4,507,061, issued Mar. 26, 1985.

From time to time, one or more of these elongated vertical turbine pumps must be removed from the tank for maintenance, including cleaning and/or replacement of bearings and seals as needed, and thereafter reinstalled. This has required disconnection of mechanical piping connections, such as by unbolting, between the pump and header as well as electrical disconnection of the electric pump motor. As will be appreciated, this involves considerable labor and expense. It also involves imposing on the user of the system requirements which greatly add to the cost of the installation. For example, in certain installations, each vertical turbine pump may have a height of 20 feet or more. To remove such pump from an operating position in a tank below working level, sufficient headroom above the filtration tank must be provided to accommodate the entire height of the pump. For example, to enable a vertical turbine pump having a length of 20 feet or more to be lifted substantially vertically from the filtration tank requires headroom above the tank of approximately a like extent. It will be appreciated that these pumps are quite heavy and require for their removal use of an overhead crane or other lifting mechanism. In many installations, there is just simply insufficient headroom or access space above the tank to enable ready and easy removal and reinstallation of the pump.

Moreover, to remove such a vertical turbine pump from an installation and reinstall it, the services of at least three skilled tradesmen are required, a millwright, an electrician and a pipefitter. Particularly, to effect removal, the electric motor must be disconnected, the bolted connections between the pump discharge and header must be removed, and valves must be closed to isolate the suction and discharge sides of the pump. Thereafter, the elongated heavy vertical turbine pump must be lifted from the tank without damaging it or adjacent ancillary equipment.

Additionally, these vertical turbine pumps are quite expensive to manufacture and are usually custom-built to meet individual application needs. They also require lubrication, which frequently necessitates use of costly automatic lubricators, and customarily have multiple bearings and other ancillary equipment necessary to support their elongated drive shafts. Further, the motors require cooling and lubrication and produce substantial noise.

As will be appreciated, it is desirable to eliminate or minimize noise levels as well as to eliminate the requirement for lubrication because periodic greasing requires substantial labor and adherence to maintenance schedules. Automatic greasing equipment, as required in some installations, substantially increases the cost of such installation. Still further, the entire area above the tank is typically misty from the coolant and moist air, driven by the motor fan for cooling purposes, and such moist air inherently dirties the electric motors, thereby increasing the probability of their malfunction. Thus, there has been a need in the industry to provide pumps which may be readily and easily removed and reinstalled in filtration tanks of this type without the foregoing and other attendant problems.

In Applicant's co-pending Patent Application, Ser. No. 144,058, filed Jan. 15, 1988 in the name of Stephen N. McEwen, which is hereby incorporated by reference, an improved pump and apparatus are disclosed which alleviate some of the aforementioned problems. In that application, the apparatus is disclosed for use in the settlement tanks of industrial machine tool coolant filtration systems like those heretofore described. More particularly, the apparatus allows a pump to be readily and easily removed from and reinstalled in a coolant tank without requiring tools to do the job.

This is accomplished by a structure that allows the pump, having an inlet port and also having a discharge head, to be mounted by the inlet port for fluid communication in an inlet receptor mounted on the bottom of the tank. Above the inlet receptor there is provided a housing or discharge receiver which receives the discharge head of the pump.

In this arrangement, upon mounting, the pump head is telescoped into the discharge receiver and the pump head into the inlet receptor to establish flow communication between an inlet source and discharge. While this installation has proven satisfactory and solved the problems associated with prior mounting arrangements, proper alignment between the housing or discharge receiver and inlet port receptor must be maintained as the pump unit contacts the housing in two regions and the receptor in one region. These contact points require exacting machining of the housing and receptor.

DISCLOSURE OF THE INVENTION

Accordingly, it is an object of the present invention to provide an improvement in mounting a vertical turbine pump between inlet and discharge means.

Another object of the invention is to provide a mounting apparatus that requires less machining than earlier mounting arrangements.

A more specific object of the invention is the improvement of reducing the number of contact regions in an apparatus. Apparatus for use with a pumping system, including a receptor adapted to receive liquid from a source, a discharge conduit, and a pump including an inlet port, discharge head and an impeller rotatable about an axis for pumping liquid from the receptor to the discharge conduit and removably mounted with respect to the discharge conduit and the receptor for servicing or replacement of the pump. The improvement comprises a substantially permanently stationary pipe column which extends from the receptor to the connector and includes a first end for removably receiving and freely suspendably mounting the pump. The pipe column also includes a second end in liquid flow communication with the inlet port and may include a check valve between the pump inlet port and the source of liquid.

The first end includes a housing substantially permanently connected to the discharge conduit connector for liquid flow communication with the housing. The housing defines, in part, with the means carried by the pump discharge head, a chamber in liquid flow communication with the connector when the pump is received in the first end whereby liquid may be discharged into the discharge conduit. The second end defines an inlet passageway in telescopic slip-fit support relation with the receptor for liquid flow communication with the supply source and support of the pipe column, whereby the liquid may be pumped from the supply source through the discharge conduit, when the pump inlet port and impeller are freely suspendably mounted in the pipe column.

Additional objects, features and advantages of the present invention will be readily apparent from the following detailed description of the best mode for carrying out the invention when taken in connection with the accompanying drawings.

BRIEF DESCRIPTION OF THE DRAWINGS

FIG. 2 is an exploded perspective view, illustrating the pump mounting apparatus of FIG. 1;

BEST MODE FOR CARRYING OUT THE INVENTION

Figure 1:
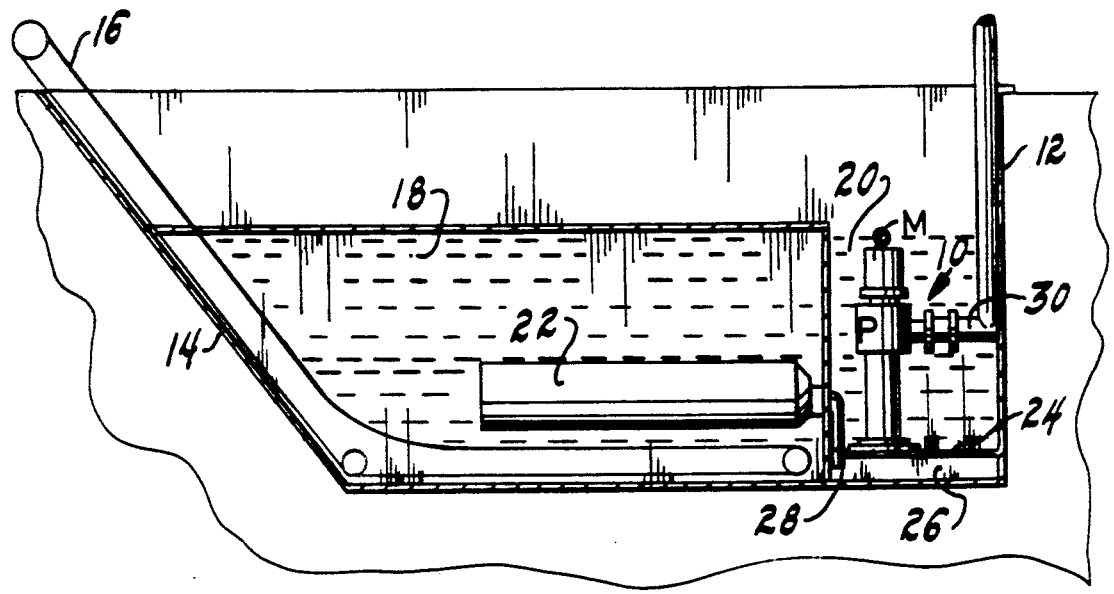
FIG. 1 is a fragmentary longitudinal cross-sectional view through a filtration tank illustrating, in elevation, a pump mounting apparatus for facilitating the removal of the pump when constructed in accordance with the present invention and installed in operative position in the tank.

With reference to FIG. 1 of the drawings, a pump and mounting for a filtration system constructed in accordance with the present invention are generally indicated by reference numeral 10 and are used in connection with a settling tank 12 set into a pit disposed below the floor level or elevation F in an industrial environment. Although the pump mounting arrangement 10 is illustrated for use with a filtration system, it is also adaptable to other fluid handling systems where pumps are utilized and require easy servicing. As is more fully hereinafter described, pump mounting 10 allows for drop in fitting of a pump, generally designated P, into a filtration system without the use of tools and eliminates prior art concerns with pump alignment. A motor, designated M, is connected to and operable for running the pump P.

As illustrated in FIG. 1, tank 12 is generally rectilinear in configuration, but has a sloping end wall 14 for use in conjunction with a drag-out conveyor, schematically illustrated at 16. As will be appreciated from the ensuing description, tank 12 is preferably comprised of two discrete compartments, a dirty or contaminated coolant compartment, designated 18, for receiving dirty coolant from sluiceways, not shown, in communication with machine tools, also not shown, and a clean coolant compartment 20 for receiving clean, filtered coolant from tank 18.

Within dirty coolant compartment 18 there is provided a horizontally disposed drum filter 22 for filtering the dirty coolant, whereby clean coolant filtrate may be supplied to machine tools. More particularly, a suction is drawn on the inside of the drum 22 by pump P of the present invention. Coolant in dirty filter tank compartment 18 thus passes through the drum filter 22 where filtered coolant is supplied by the pump P to the machine tools.

In the present invention, the drag-out conveyor 16 is conventional in construction and serves to remove both solids, settled out from the coolant and filter cake removed from the filtered drum 22 by a doctor blade, not shown, both of which settle to the bottom of tank compartment 18. Clean coolant compartment 20 includes an elevated or false floor 24 above the lower tank wall bottom and which defines a lower chamber 26 for receiving clean coolant from the suction side of drum filter 22 via conduit 28.

With reference to FIGS. 1 and 2 of the drawings, a header or discharge conduit 30 disposed in clean compartment 20 is provided for communicating the clean coolant to the machine tools. Thus, clean coolant is supplied to the machine tools from the suction side of filter 22 by way of chamber 26, pump P and header 30.

Figure 3:
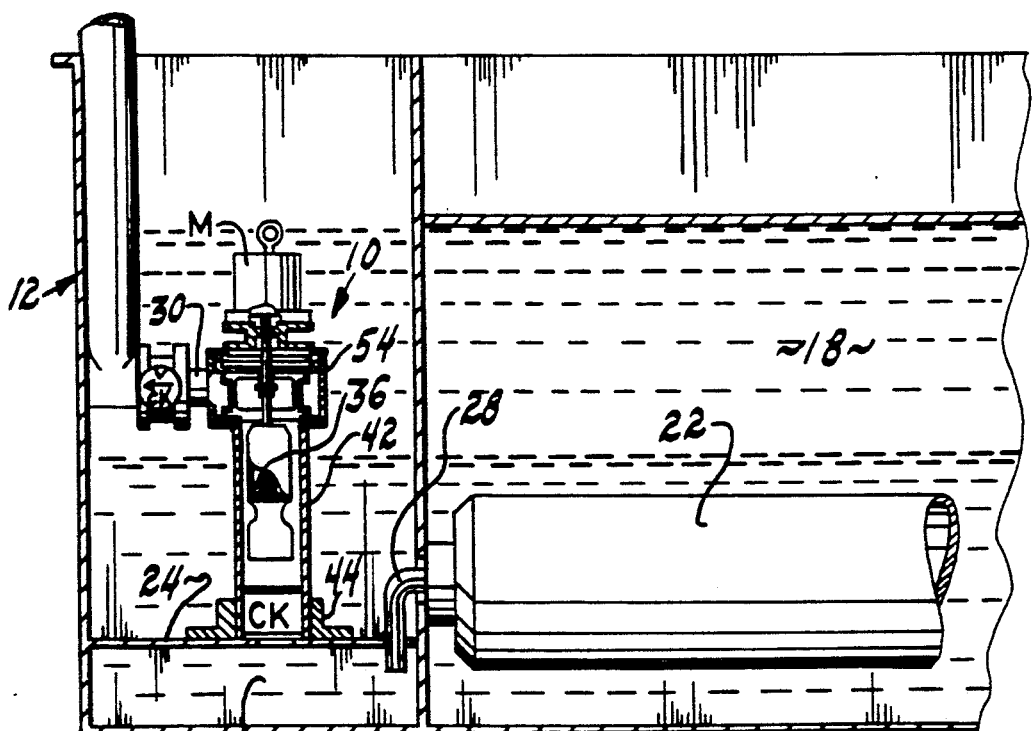
FIG. 3 is a fragmentary cross-sectional view, from the rear and partly in elevation, illustrating the pump mounting apparatus of FIG. 1 in operative position in a clean coolant compartment of the tank.
Figure 4:
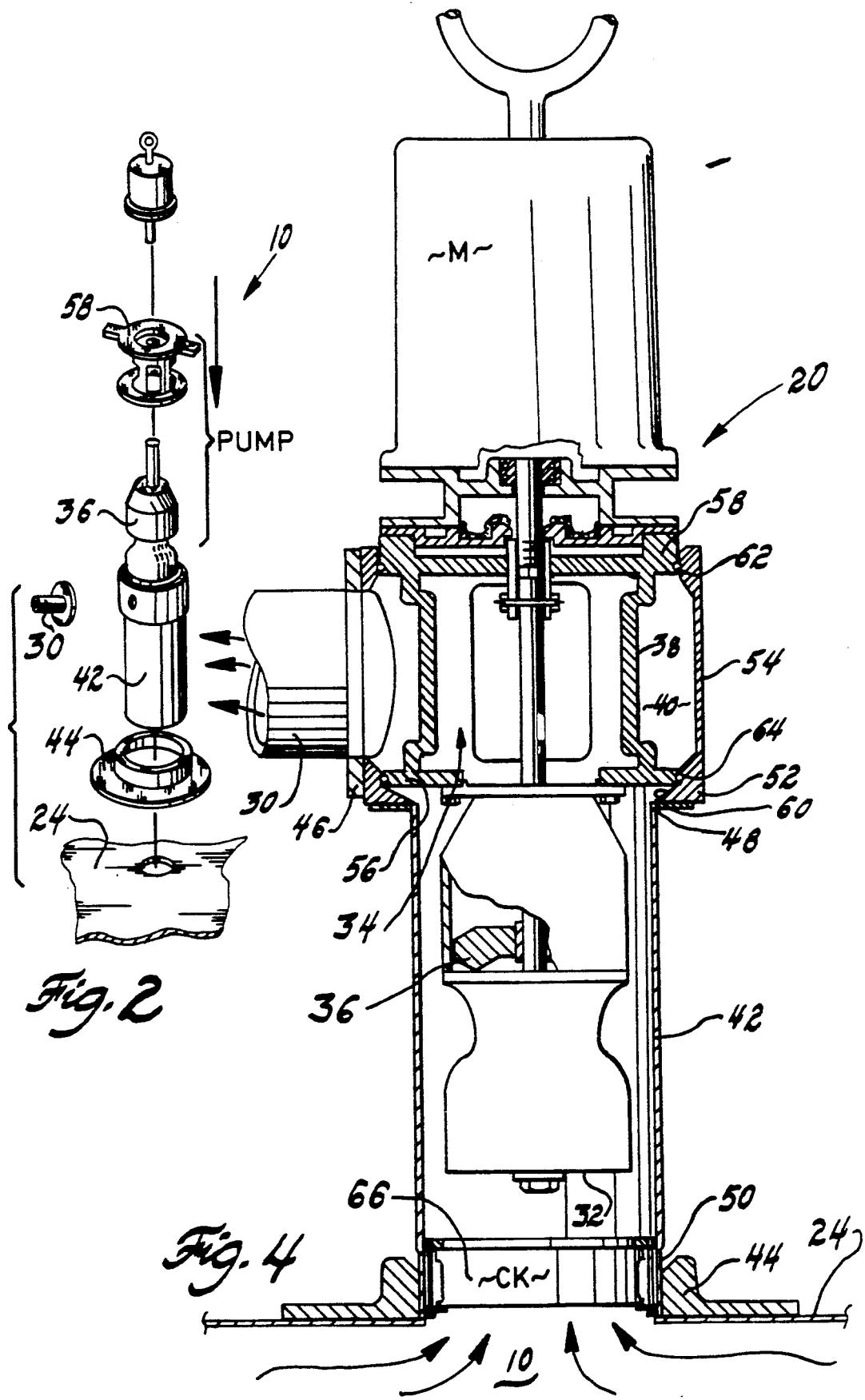
FIG. 4 is an enlarged fragmentary cross-sectional view of the pump mounting apparatus of FIG. 1 illustrating how the pump is installed for easy removal from the tank.

In the preferred embodiment illustrated in FIGS. 2 through 4, pump P is removable and has an inlet port 32, a discharge head 34, and an impeller 36 mounted for rotation about an axis for supplying coolant liquid from the inlet port to the discharge head. A means 38 carried by the pump discharge head 34 defines, in part, a chamber 40 for receiving the coolant to be discharged from the head 34. A pipe column 42 extends from a receptor 44 in the false floor 24 to a connector 46 on header or discharge conduit 30. Pipe column 42 includes a first end 48 for removably receiving and freely suspendably mounting pump P therein and a second end 50 in liquid flow communication with inlet port 32. The pipe column is substantially permanently stationary whereby to provide a readily accessible enclosure for facilitating the installation and removal of the pump by reducing and minimizing the alignment points between pump and enclosure.

With continued reference to FIG. 4 of the drawings, first end 48 includes a housing 52 connected to the discharge conduit connector 46 for coolant liquid flow communication therewith. Housing 52 defines, in part, with means 38 carried by the pump discharge head 34 chamber 40 in liquid flow communication with the connector 46 when pump P is received in first end 48 of the pipe column 42, whereby the coolant may be discharged into the discharge conduit or header 30. The second end 50 defines an inlet passageway in telescopic slip-fit support relation with the receptor 44 for liquid flow communication with the clean coolant compartment 20 and support of the pipe column 42. Thereby the coolant liquid is pumped from clean coolant compartment 20 through discharge conduit or header 30 when the pump inlet port 32 and impeller 36 are freely suspendably mounted in pipe column 42.

With further reference to FIG. 4 of the drawings, housing 52 includes an enclosure 54 for encompassing at least, in part, the pump discharge head 34 when pump P is mounted in pipe column 42. The pump discharge head 34 includes a pair of end walls 56, 58 spaced along the rotational axis and, in part, defining the chamber 40 therebetween. End walls 56, 58, in part, define means 38 carried by the end walls for engaging enclosure 54 such that the chamber 40 is defined, in part, by the enclosure and end walls thereby establishing liquid coolant flow communication between the discharge conduit or header 30 and inlet port 32 of pump P.

Housing 52 has a radially inwardly directed abutment 60 for engaging the pump discharge head 34 and O-rings 62, 64 carried by end walls 56, 58 at the location of the engagement of the discharge head with the abutment for sealing chamber 40 against leakage of coolant.

Receptor 44 is supported on false floor 24 which, in turn, supports the pipe column 42. A check valve 66 is supported within the lower end of the pipe column above the false floor to prevent liquid coolant communication between lower chamber 26 and pipe column 42 when pump P is inoperable or removed. It can be readily appreciated that pump P, including inlet port 32, discharge head 34 and impeller 36, can be slip-fitted into and out of the filtration system by simply raising or lowering, as the case may be, because pump P is suspendably mounted in the first end 48 of pipe column 42. This mounting facilitates installation and removal of the pump P without connecting or disconnecting any parts requiring tools and provides only two contact or alignment regions between pump P and the pipe column 42 where O-rings 62 and 64 are in sealing engagement between end walls 56 and 58 and the circumscribing housing 52. Consequently, the impeller 36 is freely suspended in pipe column 42 and no mating tolerances are required.

Figure 5:
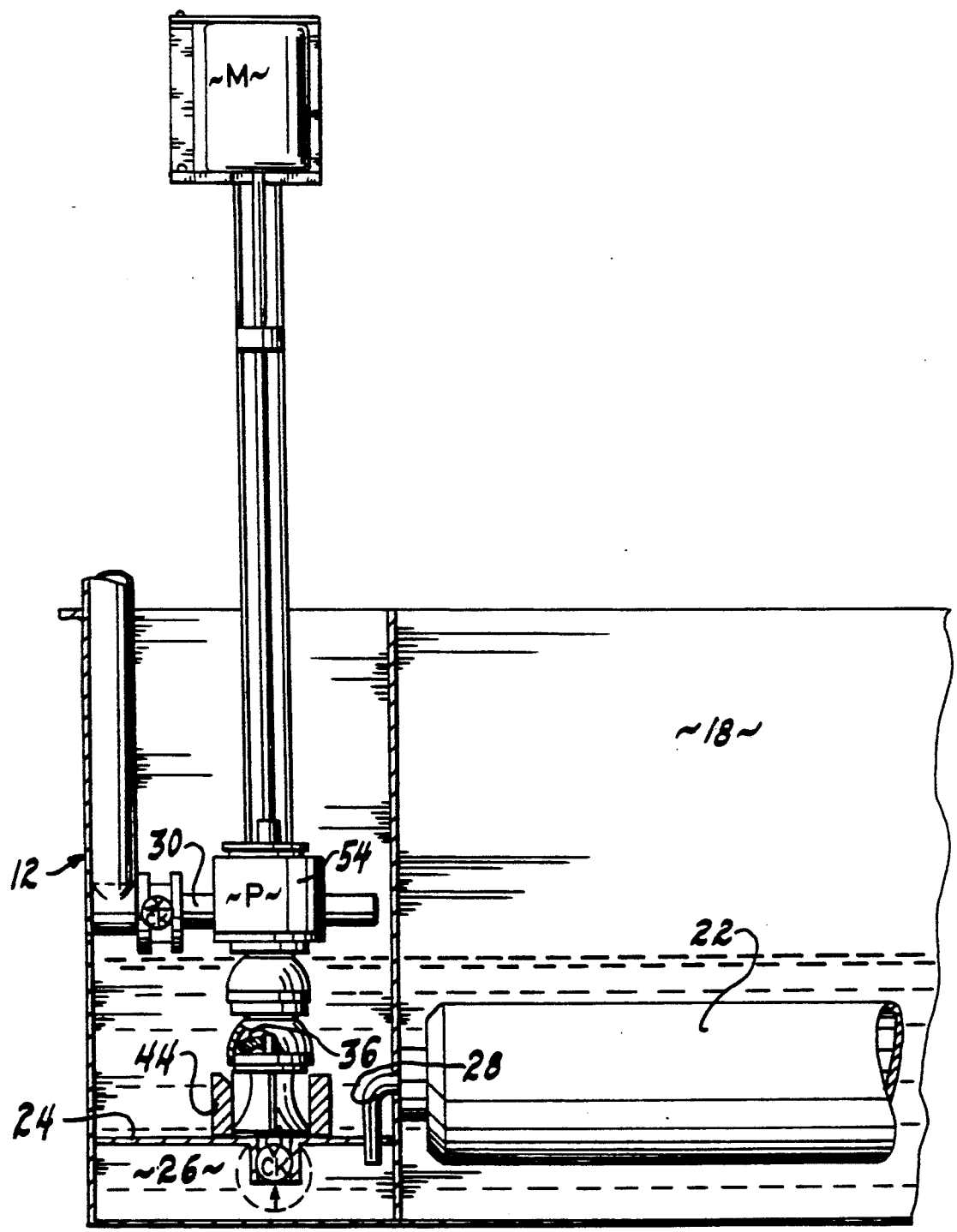
FIG. 5 is an enlarged fragmentary cross-sectional view similar to FIG. 3 illustrating the pump mounting system of my application S.N. 144,058.

FIG. 5 of the drawings is taken from my co-pending U.S. Pat. Application Ser. No. 144,058 which is herein incorporated by reference. Shown is a pump mounting arrangement wherein like reference characters refer to like parts. This pump mounting arrangement requires not only critical mounting connections at the discharge head 34, but also at receptor 44, which had to be sized to receive an impeller of pump P. This sizing requires exacting machining. Surprisingly, the criticality of the mounting connections and such machining requirements have been eliminated by freely suspending a removable pump in a permanent pipe column in accordance with my improved mounting described herein.

While the best mode for carrying out the invention has been described in detail, those familiar with the art to which this invention relates will recognize alternative ways of practicing this invention as defined by the following claims.

What is claimed is:

1. Apparatus for pumping liquid in combination with a liquid supply source including a receptor and a discharge conduit including a connector, said apparatus comprising:

a pump having as a removable unit in inlet port, a discharge head, and an impeller mounted for rotation about an axis for supplying liquid from said inlet port to said discharge head; and a pipe column extending from said receptor to said connector and including a first end for removably receiving and suspendably mounting said removable unit therein and a second end in liquid flow communication with said inlet port; said pipe column providing an enclosure for said impeller between said first and second ends when said removable unit is mounted therein;

said first end including an accessible housing normally permanently connected to said connector and in liquid flow communication with said discharge conduit; said housing defining a chamber with said discharge head in liquid flow communication with said discharge conduit when said removable unit is received in said first end whereby liquid may be discharged into said discharge conduit; said second end defining an inlet passageway in support relation with said receptor for liquid flow communication with said supply source and support of said pipe column, whereby said liquid may be pumped from said supply source through said discharge conduit when said removable unit is suspendably mounted in said pipe column and whereby the housing of said pipe column remains connected to said connector when said removable unit is removed to allow subsequent drop in assembly of said removable unit into said accessible housing without having to align said impeller.

2. Apparatus according to claim 1 wherein said housing encompasses at least in part said pump discharge head when said removable unit is mounted in said column, said pump discharge head including a pair of end walls spaced along an axis and in part defining said chamber therebetween, and means carried by said end walls for engaging said housing to close said chamber and establish liquid flow communication between said discharge conduit and said inlet port.

3. Apparatus according to claim 2 wherein said housing has a radially inwardly directed abutment circumscribing said pump discharge head and means carried by said end wall for sealing said chamber at said abutment.

4. Apparatus according to claim 3 wherein said sealing means is an O-ring.

5. Apparatus according to claim 1 including an electric motor connected to said removable unit to drive the pump.

6. Apparatus for use with a pumping system including a receptor adapted to receive liquid from a source, a discharge conduit, and a pump including an inlet port, a discharge head and an impeller rotatable about an axis for pumping liquid from said receptor to said discharge conduit and removably mounted as a unit with respect to said discharge conduit and said receptor for servicing or replacement of said pump, the improvement to reduce the number of alignment points in the mounting of said pump with respect to said receptor comprising:

means carried by said pump discharge head defining at least in part a chamber for receiving the liquid to be discharged from said head; and a substantially permanently stationary pipe column extending from said receptor to said discharge conduit and including a first end for removably receiving and freely suspendably mounting said pump therein and a second end in liquid flow communication with said inlet port; said pipe column providing an enclosure for said impeller between said first and second ends when said removable unit is mounted therein;

said first end including an accessible housing connected to said discharge conduit for liquid flow communication therewith; said housing defining in part with said means carried by said pump discharge head a chamber in liquid flow communication with said discharge conduit when said pump is received in said first end whereby liquid may be discharged into said discharge conduit; said second end defining an inlet passageway in substantially permanently stationary support relation with said receptor for liquid flow communication with said supply source and support of said pipe column, whereby said liquid may be pumped from said supply source through said discharge conduit, when said pump is freely suspendably mounted in said pipe column.

7. The apparatus of claim 6 wherein the support relation of said second end of the pipe column with said receptor is a telescopic slip fit.

8. The apparatus of claim 6 wherein the second end of said pipe column includes a check valve supported therein between the inlet port of said pump and the source of said liquid.

* * * * *

UNITED STATES PATENT AND TRADEMARK OFFICE
CERTIFICATE OF CORRECTION

PATENT NO. : 5,135,364

DATED : August 4, 1992

INVENTOR(S) : Stephen N. McEwen

It is certified that error appears in the above-identified patent and that said Letters Patent is hereby corrected as shown below:

Col. 1, line 41, delete "periodic" and insert
　　-- periodically --.

Col. 1, line 46, after "coolant", insert -- tank --.

Col. 3, line 43, before "discharge" insert -- a --.

Col. 6, line 44, delete "in" and insert -- an --.

Signed and Sealed this

Seventh Day of September, 1993

*Attest:*

BRUCE LEHMAN

*Attesting Officer*　　Commissioner of Patents and Trademarks